(12) United States Patent
Kageyama

(10) Patent No.: US 10,262,805 B2
(45) Date of Patent: Apr. 16, 2019

(54) VARIABLE CAPACITANCE ELEMENT

(71) Applicant: Murata Manufacturing Co., Ltd., Nagaokakyo-shi, Kyoto-fu (JP)

(72) Inventor: Keisuke Kageyama, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 15/686,276

(22) Filed: Aug. 25, 2017

(65) Prior Publication Data

US 2017/0352490 A1    Dec. 7, 2017

Related U.S. Application Data

(63) Continuation of application No. PCT/JP2016/055338, filed on Feb. 24, 2016.

(30) Foreign Application Priority Data

Feb. 27, 2015  (JP) .................. 2015-039341

(51) Int. Cl.
*H01G 7/06* (2006.01)

(52) U.S. Cl.
CPC ..................... *H01G 7/06* (2013.01)

(58) Field of Classification Search
USPC ........................................................ 361/281
See application file for complete search history.

(56) References Cited

U.S. PATENT DOCUMENTS

| 2011/0163827 A1* | 7/2011 | Kanno | H01G 4/255 |
| | | | 333/185 |
| 2014/0225793 A1 | 8/2014 | Ikemoto et al. | |
| 2014/0376149 A1* | 12/2014 | Lamorey | H05B 3/023 |
| | | | 361/280 |

FOREIGN PATENT DOCUMENTS

| CN | 103210456 A | 7/2013 |
| JP | 10-223475 A | 8/1998 |
| JP | 2006-245367 A | 9/2006 |
| JP | 2013-536989 A | 9/2013 |
| WO | 2013/061985 A1 | 5/2013 |
| WO | 2013/183472 A1 | 12/2013 |

OTHER PUBLICATIONS

Official Communication issued in International Patent Application No. PCT/JP2016/055338, dated May 17, 2016.
Kageyama, "Variable Capacitance Element", U.S. Appl. No. 15/686,272, filed Aug. 25, 2017.
Official Communication issued in corresponding Chinese Patent Application No. 201680011049.4, dated Jun. 1, 2018.

* cited by examiner

*Primary Examiner* — Michael P McFadden
(74) *Attorney, Agent, or Firm* — Keating & Bennett, LLP

(57) ABSTRACT

A variable capacitance element includes variable capacitance layers made of a dielectric material, paired electrodes located on both main surfaces of the variable capacitance layers opposite to each other across the variable capacitance layers, insulating elements; and at least one pair of lead-out elements. The variable capacitance layers and the insulating elements are alternately laminated to provide a laminated body. The variable capacitance layers and the paired electrodes define capacitor structures, and the lead-out elements are electrically connected at one end thereof to an electrode defining the capacitor structures, penetrate the insulating elements, and are electrically connected at the other end to external electrodes or other electrical elements.

16 Claims, 6 Drawing Sheets

VARIABLE CAPACITANCE ELEMENT

CROSS REFERENCE TO RELATED APPLICATIONS

This application claims the benefit of priority to Japanese Patent Application No. 2015-039341 filed on Feb. 27, 2015 and is a Continuation Application of PCT Application No. PCT/JP2016/055338 filed on Feb. 24, 2016. The entire contents of each application are hereby incorporated herein by reference.

BACKGROUND OF THE INVENTION

1. Field of the Invention

The present invention relates to a variable capacitance element.

2. Description of the Related Art

A known variable capacitance element has an electrostatic capacitance that is varied by changing a permittivity of a dielectric layer by being applied voltage.

For example, International Publication No. 2013/061985 discloses a variable capacitance element including a ferroelectric thin film and a thin film electrode formed by a chemical solution deposition (CSD) method and a sputtering method, respectively.

The element disclosed in International Publication No. 2013/061985 has a relatively large conduction loss because a thickness of an electrode is thin and unable to satisfy a skin depth, and an electrode material is limited to Pt or Au in order to prevent peeling in an annealing treatment after electrode formation so that Ag or Cu with low loss at high frequencies cannot be used. Additionally, since the electrostatic capacitance is acquired from a ferroelectric film FS2 sandwiched by capacitor electrodes PT1 and PT 2 in FIG. 5 of International Publication No. 2013/061985, an electrostatic capacitance value, temperature characteristics, an electrostatic capacitance variable rate, and other properties are determined by the characteristics of the ferroelectric film FS2 and, therefore, the element also has a problem of a small degree of freedom in design of characteristics.

SUMMARY OF THE INVENTION

Preferred embodiments of the present invention provide variable capacitance elements having a small loss at high frequencies and a high degree of freedom in design of element characteristics, such as an electrostatic capacitance value, temperature characteristics, an electrostatic capacitance variable rate.

As a result of intensive studies aimed at solving the problems described above, the inventor of the present invention has discovered that characteristics, such as an electrostatic capacitance value, temperature characteristics, and an electrostatic capacitance variable rate, are able to be freely designed by providing a variable capacitance element including a plurality of dielectric layers and a plurality of paired electrodes and including a plurality of capacitor structures. The present inventor also has discovered that a low-loss material suitable for use at high frequencies, i.e., copper or silver, is able to be used as an electrode material by providing a configuration in which the electrodes and lead-out elements are able to be sintered separately from an element main body.

A preferred embodiment of the present invention provides a variable capacitance element including a plurality of variable capacitance layers made of a dielectric material; a plurality of paired electrodes located on both main surfaces of the variable capacitance layers opposite to each other across the variable capacitance layers; a plurality of insulating elements; and at least one pair of lead-out elements; wherein the plurality of variable capacitance layers and the plurality of insulating elements are alternately laminated to provide a laminated body; the plurality of variable capacitance layers and the plurality of paired electrodes define a plurality of capacitor structures; and the lead-out elements are electrically connected at one end of the electrodes defining the capacitor structures, penetrate the insulating elements, and are electrically connected at the other end to external electrodes or other electrical elements.

Preferred embodiments of the present invention provide variable capacitance elements having characteristics, such as an electrostatic capacitance value, temperature characteristics, and an electrostatic capacitance variable rate of the entire variable capacitance element, that are able to be freely designed by using a plurality of dielectric layers and a plurality of paired electrodes to define a plurality of capacitor structures in the variable capacitance element.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Variable capacitance elements according to preferred embodiments of the present invention will now be described in detail with reference to the drawings. However, shapes, arrangements, and other configurations of the variable capacitance element and constituent elements of the preferred embodiments are not limited to the shown examples.

Figure 1:
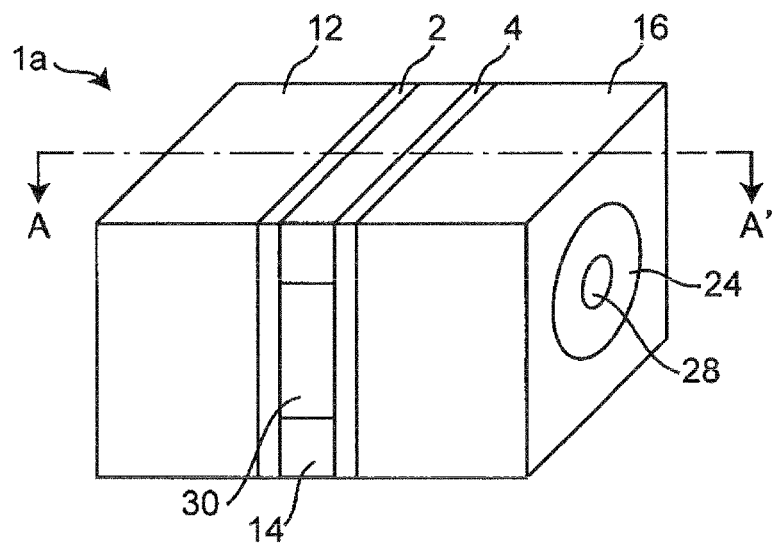
FIG. 1 is a schematic perspective view of a variable capacitance element 1a according to a preferred embodiment of the present invention.
Figure 2:
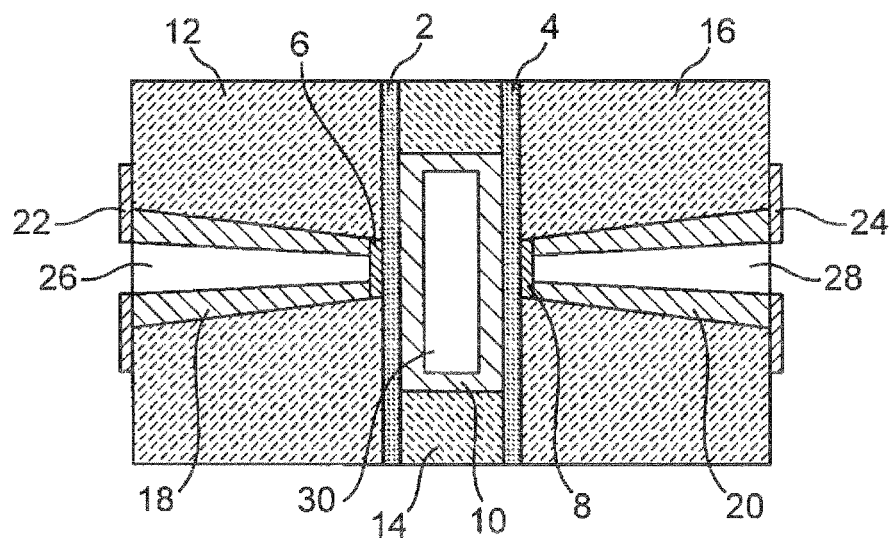
FIG. 2 is a schematic cross-sectional view taken along A-A' of the variable capacitance element 1a according to the preferred embodiment of FIG. 1.

As shown in FIGS. 1 and 2, a variable capacitance element 1a according to a preferred embodiment of the present invention includes variable capacitance layers 2 and 4, electrodes 6, 8, and 10, insulating elements 12, 14, and 16, lead-out elements 18 and 20, and external electrodes 22 and 24. The variable capacitance layers and the insulating elements are laminated in order of the insulating element 12, the variable capacitance layer 2, the insulating element 14, the variable capacitance layer 4, and the insulating element 16. The electrodes 6 and 10 are located opposite to each other across the variable capacitance layer 2 to define one capacitor structure. The electrodes 8 and 10 are located opposite to each other across the variable capacitance layer 4 to define another capacitor structure. These capacitor structures are electrically arranged in series. The electrode 6 is electrically connected to one end of the lead-out element 18 provided in a via hole 26 penetrating the insulating element 12, and the other end of the lead-out element 18 is electrically connected to the external electrode 22. Similarly, the electrode 8 is electrically connected to one end of the lead-out element 20 provided in a via hole 28 penetrating the insulating element 16, and the other end of the lead-out element 20 is electrically connected to the external electrode 24. The electrode 10 is located in an opening 30 provided in the insulating element 14 and is structured and functions as both electrodes in the capacitor structure including the variable capacitance layer 2 and the capacitor structure including the variable capacitance layer 4.

In another preferred embodiment of the present invention, in a variable capacitance element 1b, a plurality of capacitor structures are preferably arranged in parallel.

Figure 4:
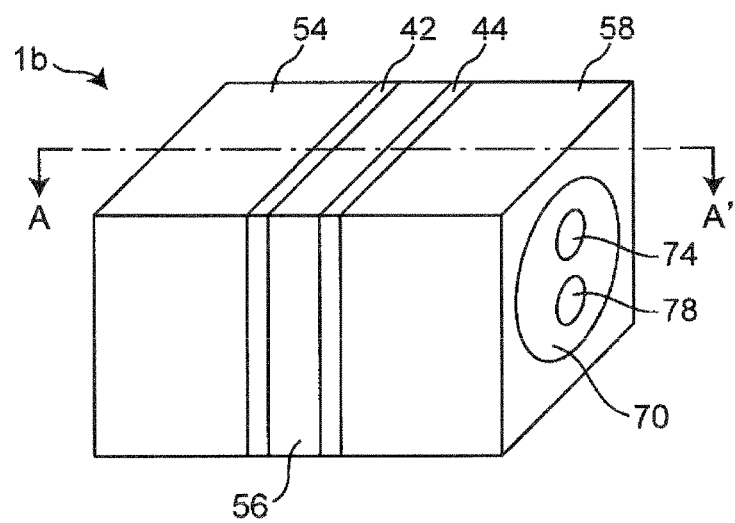
FIG. 4 is a schematic perspective view of the variable capacitance element 1b according to another preferred embodiment of the present invention.
Figure 5:
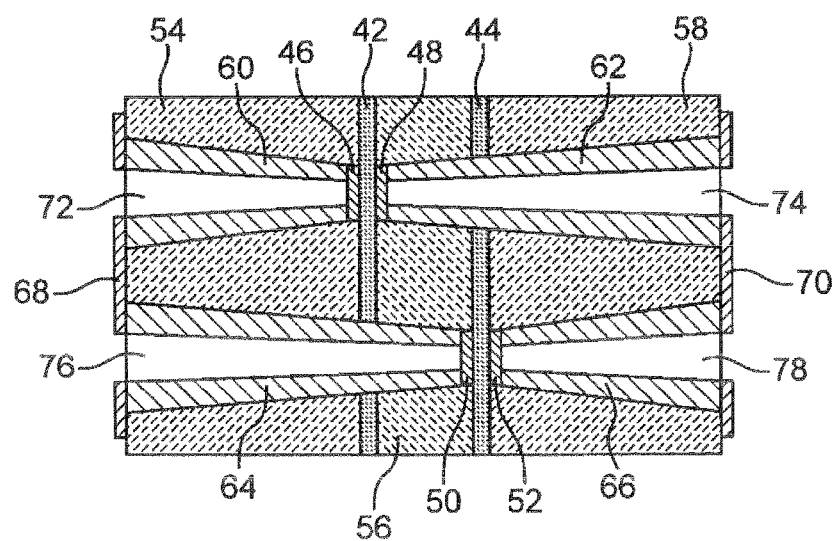
FIG. 5 is a schematic cross-sectional view taken along A-A' of the variable capacitance element 1b according to the preferred embodiment of FIG. 4.

As shown in FIGS. 4 and 5, the variable capacitance element 1b of the present preferred embodiment includes variable capacitance layers 42 and 44, electrodes 46, 48, 50, and 52, insulating elements 54, 56, and 58, lead-out elements 60, 62, 64, and 66, and external electrodes 68 and 70. The variable capacitance layers and the insulating elements are laminated in order of the insulating element 54, the variable capacitance layer 42, the insulating element 56, the variable capacitance layer 44, and the insulating element 58. The electrodes 46 and 48 are located opposite to each other across the variable capacitance layer 42 to define one capacitor structure. The electrodes 50 and are located opposite to each other across the variable capacitance layer 44 to define another capacitor structure. These capacitor structures are electrically arranged in parallel. The electrode 46 is electrically connected to one end of the lead-out element 60 provided in a via hole 72 penetrating the insulating element 54, and the other end of the lead-out element 60 is electrically connected to the external electrode 68. Similarly, the electrode 48 is electrically connected to one end of the lead-out element 62 provided in a via hole 74 penetrating the insulating elements 56 and 58 as well as the variable capacitance layer 44, and the other end of the lead-out element 62 is electrically connected to the external electrode 70. The electrode 50 is electrically connected to one end of the lead-out element 64 provided in a via hole 76 penetrating the insulating elements 54 and 56 as well as the variable capacitance layer 42, and the other end of the lead-out element 64 is electrically connected to the external electrode 68. Similarly, the electrode 52 is electrically connected to one end of the lead-out element 66 provided in a via hole 78 penetrating the insulating element 58, and the other end of the lead-out element 66 is electrically connected to the external electrode 70.

The variable capacitance layers are made of one or more types of dielectric materials. By adjusting the thickness and type of the dielectric materials, the capacitance of the variable capacitance element is able to be adjusted.

The dielectric material is not particularly limited as long as the material is dielectric, and is preferably a ferroelectric material. By using a ferroelectric material, the capacitance and the electrostatic capacitance variable rate of the variable capacitance element is able to be increased.

Examples of the ferroelectric material are not particularly limited, and include a material containing one or more, preferably two or more elements selected from Ba, Sr, Nb, Ti, Zr, and Bi. Particularly preferred dielectric materials include materials containing (i) at least one of Ba and Sr, and (ii) at least one of Ti and Zr. Examples of the ferroelectric materials include, for example, one or more ferroelectric materials selected from sintered ceramic containing Ba, Sr, and Ti as well as sintered ceramic containing Ba, Zr, and Ti, for example $(Ba_xSr_y)TiO_3$, $Ba(Zr_xTi_y)O_3$ (where x and y are greater than zero and less than one, and the sum of x and y is one). Another preferred example of the ferroelectric material includes a material containing Nb, for example, sintered ceramic containing Bi, Zn, and Nb, for example, $(Bi_xZn_y)Nb_2O_7$.

In a preferred embodiment of the present invention, the plurality of variable capacitance layers included in the variable capacitance element may be made of the same material or may be made of different materials. In a preferred embodiment of the present invention, for the multiple variable capacitance layers, at least one layer, and preferably, each of the plurality of layers, is made of a different material. By using the variable capacitance layers made of different materials, the degree of freedom in design of the characteristics of the variable capacitance element is increased.

The thickness of the variable capacitance layers is not particularly limited, and is, for example, about 0.5 μm or more and about 100 μm or less, preferably about 1 μm or more and about 10 μm or less, and more preferably about 1 μm or more and about 5 μm or less. The thickness of the variable capacitance layer is preferably about 10 μm or less from the viewpoint of increasing the capacitance of the variable capacitance element and is preferably about 1 μm or more so as to reliably ensure the insulation, for example.

In the variable capacitance element according to a preferred embodiment of the present invention, the paired electrodes are located opposite to each other on both main surfaces of the variable capacitance layer. The capacitance structure is provided by the variable capacitance element and the paired electrodes. The capacitance of the variable capacitance element is able to be adjusted by changing the areas of the contact surfaces between the electrode and the variable capacitance layer. It is noted that when the capacitor structures in the variable capacitance element are electrically arranged in series, the electrode in the middle (e.g., the electrode 10 in FIG. 2) is able to define and function as an electrode of both of the two capacitor structures and may not be connected to the lead-out elements in this case.

The paired electrodes may have any size and any shape at any position on the variable capacitance layer as long as the electrodes are opposite to each other. However, preferably, the paired electrodes have the same size and the same shape as each other and are arranged symmetrically with respect to the variable capacitance layer.

Examples of the material used for the electrodes is not particularly limited as long as the material is conductive, and include Ag, Cu, Pt, Ni, Al, Pd, Au, monel (Ni—Cu alloy), and other suitable materials. Among them, Ag or Cu is preferable because of a low conduction loss at high frequencies.

The thickness of the electrodes is not particularly limited, and is, for example, preferably about 0.5 µm or more. By setting the thickness of the electrodes to about 0.5 µm or more, the resistance is able to be further reduced and the skin depth is able to be ensured.

In a variable capacitance element according to a preferred embodiment of the present invention, the multiple capacitor structures may all have the same electrostatic capacitance or may have different electrostatic capacitances.

In a preferred embodiment of the present invention, among the multiple capacitor structures, at least one capacitor structure has an electrostatic capacitance different from the other capacitor structures. By setting the electrostatic capacitances of the multiple capacitor structures to different electrostatic capacitances in this manner, the characteristics of the variable capacitance element are able to be adjusted. The electrostatic capacitances of the capacitor structures is able to be adjusted by changing the size of the electrodes, the material and the thickness of the variable capacitance layers, and other parameters.

In the variable capacitance element according to a preferred embodiment of the present invention, the lead-out elements are electrically connected to the electrodes and have a function of extending the electrodes to the outside of the variable capacitance element. In the variable capacitance elements 1a and 1b, the lead-out electrodes are connected to the external electrodes. However, the external electrodes are not essential, and the lead-out elements may be directly connected to other electrical elements, for example, wirings or leads.

In a preferred embodiment of the present invention, the paired lead-out elements (e.g., the lead-out elements 18 and 20 in FIG. 2, and the lead-out elements 60 and 62 as well as the lead-out elements 64 and 66 in FIG. 5) are provided on the same axis perpendicular or substantially perpendicular to the variable capacitance layer. "Substantially perpendicular to the variable capacitance layer" means that the angle defined by the variable capacitance layer and the axis is 90° or substantially 90° and means that the angle is, for example, about 80° or more and about 90° or less, preferably about 85° or more and about 90° or less, and more preferably about 88° or more and about 90° or less. With such an arrangement, the stray capacitance is able to be reduced.

Examples of the material used for the lead-out elements are not particularly limited as long as the material is conductive, and include Ag, Cu, Pt, Ni, Al, Pd, Au, monel (Ni—Cu alloy), and other suitable materials. Among them, Ag or Cu is preferable because of a low conduction loss at high frequencies.

Preferably, the lead-out elements are made of the same material as that of the electrodes and are integrally provided with the electrodes. In particular, although the electrode 6 and the lead-out element 18 as well as the electrode 8 and the lead-out element 20 are respectively shown as separate members in this preferred embodiment, these may be integrally provided as a single member.

The shape of the lead-out elements is not particularly limited, and may be, for example, a columnar shape, a truncated cone shape, a prismatic shape, a truncated pyramidal shape, or a hollow body thereof, such as a hollow columnar shape and a hollow truncated cone shape. From the viewpoint of ease of manufacturing, a hollow or solid truncated columnar or pyramidal shape is preferred. The axial length of the lead-out elements is not particularly limited, and may be appropriately selected depending on a desired element size.

The thickness of the lead-out elements is not particularly limited as long as the thickness is capable of ensuring the skin depth.

In a variable capacitance element according to a preferred embodiment of the present invention, the insulating elements are arranged to sandwich the variable capacitance layer.

The material used for the insulating elements is not particularly limited as long as the material is an insulating material, and may be, for example, a ceramic material or a resin. The ceramic material is preferable because co-firing with the variable capacitance layer is able to be performed.

The ceramic material is not particularly limited, and typical insulating ceramic materials may be used. Examples of the ceramic material include, for example, sintered bodies of glass, a metal oxide, a metal nitride, and a metal carbide.

In a preferred embodiment of the present invention, the ceramic material may be the same as the dielectric material used for the variable capacitance layer. By using the same material as the dielectric material used for the variable capacitance layer, a difference in coefficient of thermal expansion is eliminated between the insulating element and the variable capacitance layer, and a stress generated therebetween is able to be significantly reduced or eliminated at the time of sintering.

In another preferred embodiment of the present invention, the ceramic material may be a material having a lower permittivity than the dielectric material used for the variable capacitance layer. By lowering the permittivity of the ceramic material used for the insulating elements, the stray capacitance of the variable capacitance element is able to be reduced, and the electrostatic capacitance variable rate is able to be consequently made larger.

The relative permittivity of the ceramic material is not particularly limited, and is preferably about 500 or less, more preferably about 300 or less, even more preferably about 100 or less, and further more preferably about 30 or less, for example.

The thickness of the insulating elements (the thickness in the direction perpendicular or substantially perpendicular to the variable capacitance layer) is not particularly limited, and may be appropriately selected depending on a desired element size.

In the variable capacitance element according to a preferred embodiment of the present invention, the insulating elements located at both ends of a laminated body (e.g., the insulating elements 12 and 16 in FIG. 2, and the insulating elements 54 and 58 in FIG. 5) each include at least one through-hole (via hole). The lead-out element is provided inside the through-hole. If the capacitor structures are electrically arranged in parallel, the variable capacitance layers (e.g., the variable capacitance layers 42 and 44 in FIG. 5) may also include a through-hole as required, in addition to the insulating layers.

A variable capacitance element according to a preferred embodiment of the present invention includes the external electrodes on both end surfaces (the surfaces present on the left and right in FIGS. 2 and 5). Although the external electrodes are provided in this preferred embodiment, these are not essential elements, and the lead-out elements may be directly connected to external wirings without disposing the external electrodes.

Examples of the material used for the external electrode is not particularly limited as long as the material is conductive, and include Ag, Cu, Pt, Ni, Al, Pd, Au, monel (Ni—Cu alloy), and other suitable materials. Preferably, the same material as that of the electrodes and the lead-out elements is used.

Although preferred embodiments of the present invention have been described, the present invention is not limited to the variable capacitance elements 1a and 1b described above and is variously modifiable.

For example, the variable capacitance elements according to preferred embodiments of the present invention may include a conductor element on at least one of surfaces perpendicular or substantially perpendicular to the main surfaces of the variable capacitance layers among the surfaces of the variable capacitance element. By providing such a conductor element, a radiation loss of electromagnetic waves is able to be reduced.

For example, the variable capacitance element 1a in the preferred embodiment described above is produced as follows.

First, the variable capacitance layers 2 and 4 are formed using a dielectric material.

The dielectric material is formed into a sheet shape to form a dielectric sheet. For example, the dielectric material may be mixed/kneaded with a binder resin and an organic vehicle containing an organic solvent and formed into a sheet shape to obtain the dielectric sheet; although the present invention is not limited thereto. The plurality of the dielectric sheets are laminated and press-bonded to obtain the variable capacitance layers 2 and 4. A single dielectric sheet may be used as the variable capacitance layer.

Next, the insulating elements 12, 14, and 16 are formed using an insulating material.

For example, when the insulating material is a ceramic material, as is the case with the variable capacitance layer, the ceramic material may be mixed/kneaded with a binder resin and an organic vehicle containing an organic solvent and formed into a sheet shape to obtain ceramic sheets. These ceramic sheets are laminated into a desired thickness and press-bonded to obtain a laminated body of the ceramic sheets (hereinafter also referred to as a ceramic laminated body). Then, the through-holes 26 or 28 used to form the lead-out element or the openings 30 used to form the electrode 10 are formed in the ceramic laminated body to obtain the insulating elements 12, 14, and 16. A method of forming the through-holes and the openings is not particularly limited and, for example, a laser or a mechanical punch may be used for the formation. For example, a carbon paste may be filled into the formed through-holes and openings so as to prevent deformation at the time of press-bonding.

Figure 3:
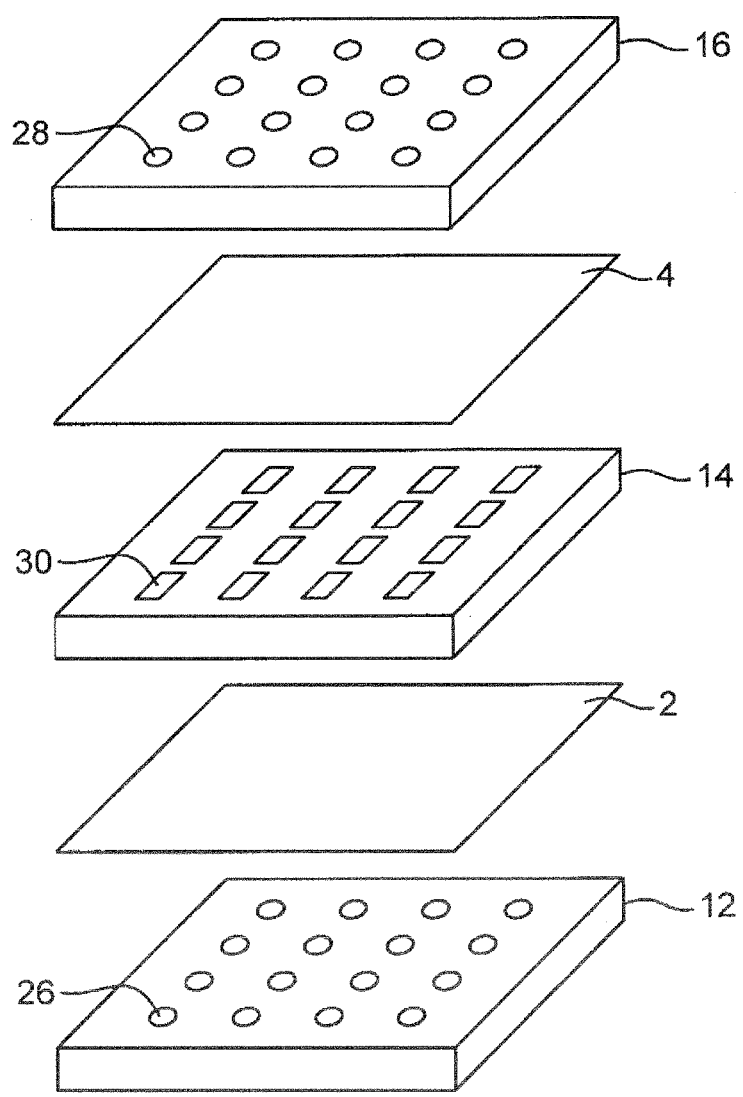
FIG. 3 is a schematic exploded perspective view of a laminated body of the variable capacitance element 1a according to the preferred embodiment of FIG. 1.

Subsequently, as shown in FIG. 3, the insulating element 12, the variable capacitance layer 2, the insulating element 14, the variable capacitance layer 4, and the insulating element 16 are laminated and press-bonded in this order such that the through-holes of the insulating elements 12 and 16 are provided on the same axis passing through the opening 30 of the insulating element 14 to obtain a laminated body, which is then cut into individual pieces by a cutting machine, for example.

Subsequently, the laminated body obtained as described above is calcined, and, a conductive material for forming the electrodes and the lead-out elements is filled as a conductor paste, for example, a silver paste, into the through-holes and the openings; and, a conductor paste for forming the external electrodes is applied to the surface on which the through-hole is exposed and is then calcined again, or a film of the conductive material is formed within the through-holes and on an external-electrode forming portion by a sputtering method, an electroless plating method, or other suitable method.

As described above, the variable capacitance element 1a in this preferred embodiment is produced in according with this example method.

The variable capacitance element 1b in this preferred embodiment described above is able to be produced in the same or similar manner as described above. However, since in the variable capacitor element 1b, the capacitor structures are arranged in parallel, each variable capacitor element 1b includes the lead-out element, and accordingly the through-holes (via holes) are also formed in the variable capacitance layers as required.

It is noted that the method of producing the variable capacitance elements 1a and 1b of the present invention is not limited to the preferred embodiments described above and is variously modifiable.

For example, when the ceramic laminated body is formed, the through-holes are formed after the laminated body is obtained as described above. However, the present invention is not limited thereto and, for example, a ceramic paste may be printed and laminated while through-holes are provided by a photolithographic method.

In the description above, the electrode and the lead-out element are formed after the calcination of the variable capacitance layer and the insulating element. However, for example, the conductor paste may filled while laminating the ceramic sheet, the conductor paste may be filled into the through-holes before the variable capacitance layer and the ceramic laminated body are laminated, or the conductor paste may be filled before the calcination and after the variable capacitance layer and the ceramic laminated body are laminated, and then the entire element may be calcined at the same time.

Alternatively, after the conductor paste for the electrodes is applied onto the main surfaces of the variable capacitance layer, the insulating element may be laminated and the conductor paste may be filled into the through-hole.

Preferably, as in the preferred embodiments described above, after the variable capacitance layer and the insulating element are calcined, the conductor paste is calcined to form the electrode and the lead-out element. By separately performing the calcination in this way, a metal, for example, Ag or Cu, having a melting point lower than the calcining temperature of the variable capacitance layer and the insulating element is able to be used as the material of the electrode and the lead-out element.

EXAMPLES

Comparative Examples 1 and 2

Figure 6:
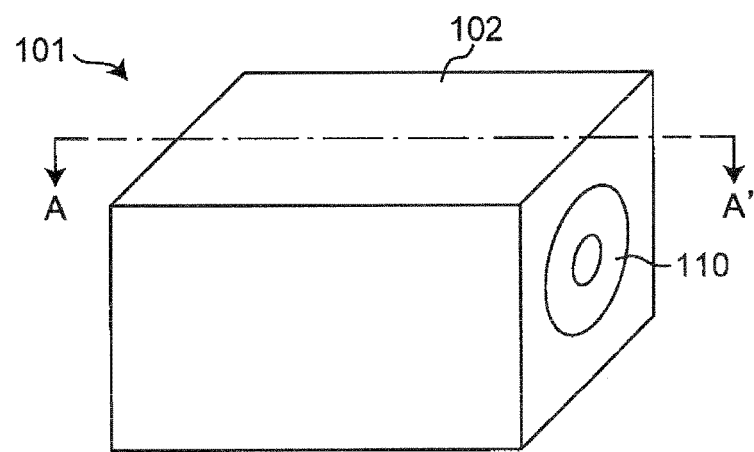
FIG. 6 is a schematic perspective view of a variable capacitance element 101 according to a preferred embodiment of the present invention that includes only one capacitor structure.
Figure 7:
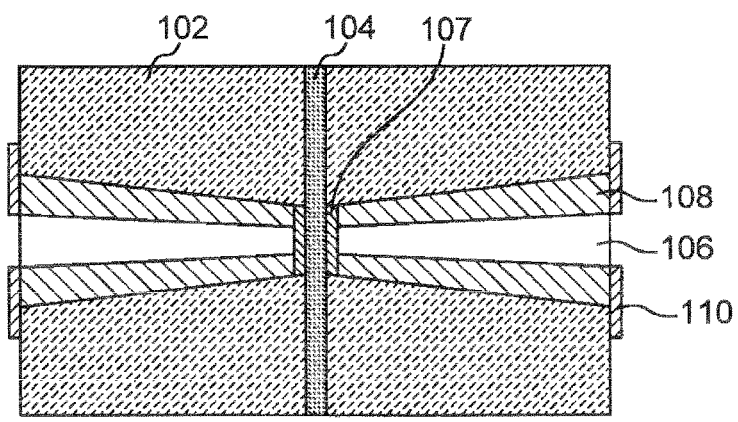
FIG. 7 is a schematic cross-sectional view taken along A-A' of the variable capacitance element 101 according to the preferred embodiment of FIG. 6.

For comparative examples, comparative examples having the same configuration as the variable capacitance element 101 shown in FIGS. 6 and 7 were produced.

To produce an insulating element 102 as shown in FIG. 7, $SrCO_3$, $TiO_2$, and $ZrO_2$ powders were prepared and weighed to achieve the composition ratio of $Sr(Ti_{0.5}Zr_{0.5})O_3$. The weighed material was placed in a ball mill, mixed and pulverized in a wet state for about 16 hours, dried, and then calcined at about 1200° C. for about two hours. After the obtained calcined material was placed in a ball mill again and pulverized in a wet state for about 16 hours, a binder and a plasticizer were added. The material is formed into a sheet shape with a thickness of about 30 μm by a doctor blade method. After the obtained sheet was punched out into a predetermined size, a plurality of sheets was laminated and temporarily press-bonded. The number of laminated sheets was 20 for each of the insulating elements of both end portions. A via hole 106 as shown in FIG. 7 was formed in the obtained laminated body by a laser and a carbon paste was filled into the via hole for via filling.

Subsequently, two types of variable capacitance layers 104 as shown in FIG. 7 were produced. First, $BaCO_3$, $SrCO_3$, $TiO_2$, and $ZrO_2$ powders were prepared and weighed to achieve the respective composition ratios of $(Ba_{0.6}Sr_{0.4})TiO_3$ and $Ba(Zr_{0.8}Ti_{0.2})O_3$. Each of the weighed materials was placed in a ball mill, mixed and pulverized in a wet state for about 16 hours, dried, and then calcined at about 1200° C. for about two hours. After the obtained calcined material was placed in a ball mill again and pulverized in a wet state for about 16 hours, a binder and a plasticizer were added, and the material is formed into a sheet shape with a predetermined thickness by a doctor blade method. The obtained sheet was punched out into a predetermined size.

Subsequently, the laminated bodies defining the insulating element and the sheet defining the variable capacitance layer produced as described above were laminated as shown in FIG. 7 in order of the laminated body, the sheet, and the laminated body, press-bonded at about 100 MPa, and press-bonded by a warm isostatic press (WIP) at about 60° C. and about 200 MPa to obtain a laminated body. The obtained laminated body was cut into individual pieces using a dicer (such that the length L=about 1.0 mm, the width W=about 0.5 mm, and the height T=about 0.5 mm were achieved as the size after firing). The obtained individual pieces of laminated bodies were placed in a calcining furnace to remove the binder and the plasticizer at the temperature of about 400° C., and the temperature was raised to between about 1250° C. and about 1350° C. and maintained for about two hours for calcining.

Figure 8:
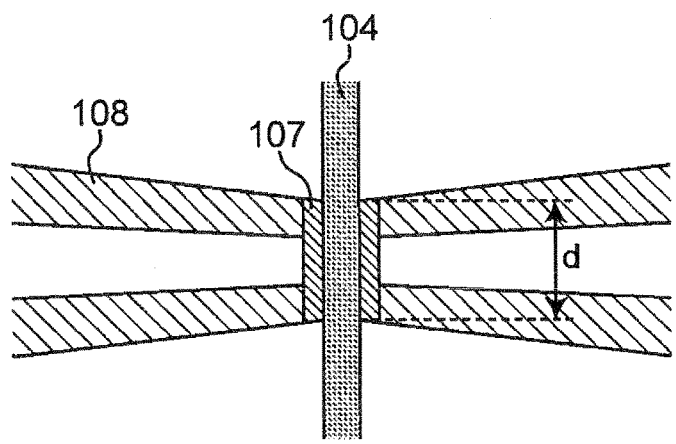
FIG. 8 is an enlarged view around an electrode portion in the schematic cross-sectional view in a variable capacitance element according to a preferred embodiment of the present invention.
Figure 9:
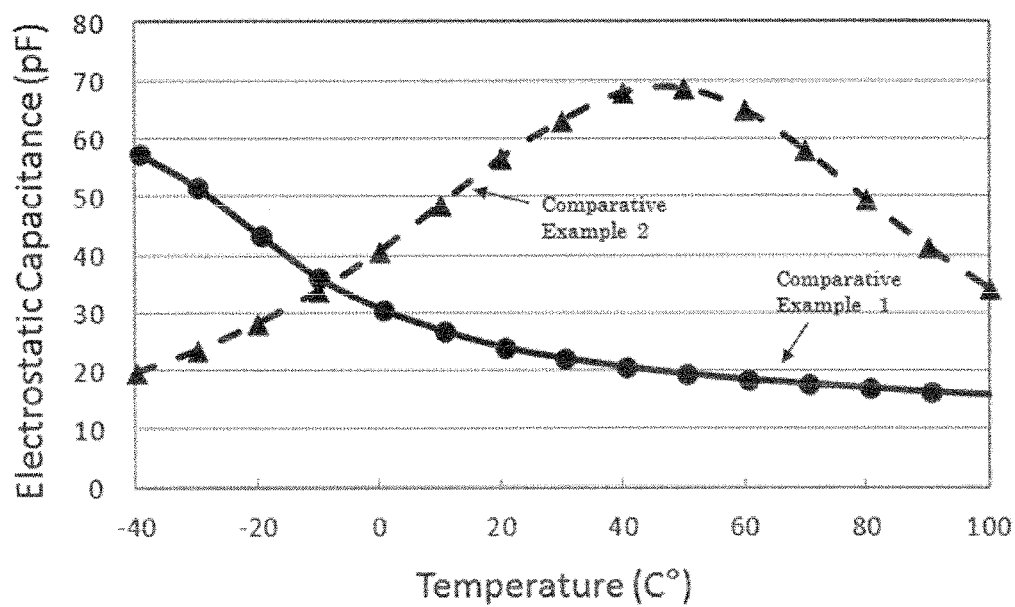
FIG. 9 is a graph of a temperature characteristic electrostatic capacitance of the electrostatic capacitance of variable capacitance elements of Comparative Examples 1 and 2.

After an Ag paste for forming the electrode 107 and the lead-out element 108 was filled in the via-hole and the same Ag paste was applied to a portion of an exposed via so as to form external electrode 110, the calcination was performed at about 750° C. to obtain samples of Comparative Examples 1 and 2 (variable capacitance elements) having the structure shown in FIGS. 6 and 7. The electrostatic capacitance value was adjusted by setting a diameter "d" of the opposite portion shown in FIG. 8 to a predetermined diameter Each of the samples of Comparative Examples 1 and 2 produced in this manner was placed in a temperature tank and an impedance analyzer (HP4294A manufactured by Agilent Technologies) was used to measure the electrostatic capacitance within a temperature range of about −40° C. to about +90° C. under the conditions of the voltage of about 1 Vrms and the frequency of about 1 kHz. Subsequently, a predetermined DC voltage was applied to the samples of Comparative Examples 1 and 2, and the electrostatic capacitance was measured under the conditions of the voltage of about 1 Vrms and the frequency of about 1 kHz to measure the capacitance variable rate. The results are shown in FIG. 9 and Table 1.

TABLE 1

| sample number | material forming variable capacitance layers | temperature change rate (%) of electrostatic capacitance | | variable rate (%, 0.5 V/μm) |
|---|---|---|---|---|
| | | maximum value | minimum value | |
| Comparative Example 1 | $(Ba_{0.6}Sr_{0.4})TiO_3$ | 116 | −23.0 | 42 |
| Comparative Example 2 | $Ba(Zr_{0.8}Ti_{0.2})O_3$ | 14.7 | −58.4 | 45 |

In Table 1, the maximum value and the minimum value of the temperature change rate of the electrostatic capacitance are the change rates at which a change rate calculated from the following equation is maximized and minimized, respectively, in the temperature range of about −30° C. to about +60° C.

Change rate $(\Delta C_t/C_t-C_{20})=(C_t-C_{20})/C_{20}\times 100 (\%)$ $C_t$: capacitance value at temperature t $C_{20}$: capacitance value at 20° C.

In Table 1, the capacitance variable rate is the change rate calculated from the following equation.

Capacitance variable rate=$(Cap_0-Cap_{DC})/Cap_0\times 100$ (%)

$Cap_{DC}$: electrostatic capacitance value when predetermined DC voltage is applied.

$Cap_0$: electrostatic capacitance value when DC voltage is not applied.

A variable capacitance element (Example 1) and a variable capacitance element (Example 2) are produced that have structures in which capacitor structures formed with variable capacitance are coupled in series as shown in FIGS. 1 and 2 and in parallel as shown in FIGS. 4 and 5, respectively, as follows.

Example 1

To produce the insulating elements shown in FIG. 1, a plurality of the sheets for forming the insulating elements produced in the comparative examples were laminated and temporarily press-bonded. The via hole and the opening as shown in FIG. 3 were formed in the obtained laminated body using a laser and were then filled with a carbon paste. The number of laminated sheets was 20 for each of the insulating elements of both end portions and five for the insulating element of a center portion.

Subsequently, the sheets for forming the variable capacitance layer produced in the comparative examples were prepared and laminated as shown in FIG. 3 in order of the laminated body (the insulating element), the sheet for forming the variable capacitance layer (material: $(Ba_{0.6}Sr_{0.4})TiO_3$), the laminated body (the insulating element of the center portion), the sheet for forming the variable capacitance layer (material: $Ba(Zr_{0.8}Ti_{0.2})O_3$), and the laminated body (the insulating element), press-bonded at about 100 MPa, and press-bonded by a warm isostatic press (WIP) at about 60° C. and about 200 MPa to acquire a laminated body. The obtained laminated body was cut into individual pieces using a dicer (such that the length L=about 1.0 mm, the width W=about 0.5 mm, and the height T=about 0.5 mm were achieved as the size after firing). The obtained individual pieces of laminated bodies were placed in a calcining furnace to remove the binder and the plasticizer at the temperature of about 400° C., and the temperature was raised to between about 13000° C. and about 14000° C. and kept for two hours for calcining.

After an Ag paste was filled into the via-hole and the same Ag paste was applied to portion of exposed via so as to form the external electrode, the calcination was performed at about 750° C. to obtain a sample of Example 1 (variable capacitance element with capacitor structures coupled in series) having the structure shown in FIGS. 1 and 2.

With regard to the electrostatic capacitance value obtained in the variable capacitance layers, the capacitance of the capacitor structure made of $(Ba_{0.6}Sr_{0.4})TiO_3$ is adjusted to about 36 pF, and the capacitance of the capacitor structure made of $Ba(Zr_{0.8}Ti_{0.2})O_3$ is adjusted to about 56 pF, at room temperature/20° C. by adjusting the thickness and the diameter "d" of the opposite portion.

Example 2

Similarly to Example 1, a sample of a variable capacitance element (Example 2) was produced that has the structure as shown in FIGS. 4 and 5 with the capacitor structures connected in parallel.

As the materials of the variable capacitance layers, similarly to Example 1, $(Ba_{0.6}Sr_{0.4})TiO_3$) and $Ba(Zr_{0.8}Ti_{0.2})O_3$) were used. The electrostatic capacitance was adjusted such that the capacitance of the capacitor structure made of $(Ba_{0.6}Sr_{0.4})TiO_3$ is about 36 pF, while the capacitance of the capacitor structure portion made of $Ba(Zr_{0.8}Ti_{0.2})O_3$ is about 56 pF.

Figure 10:
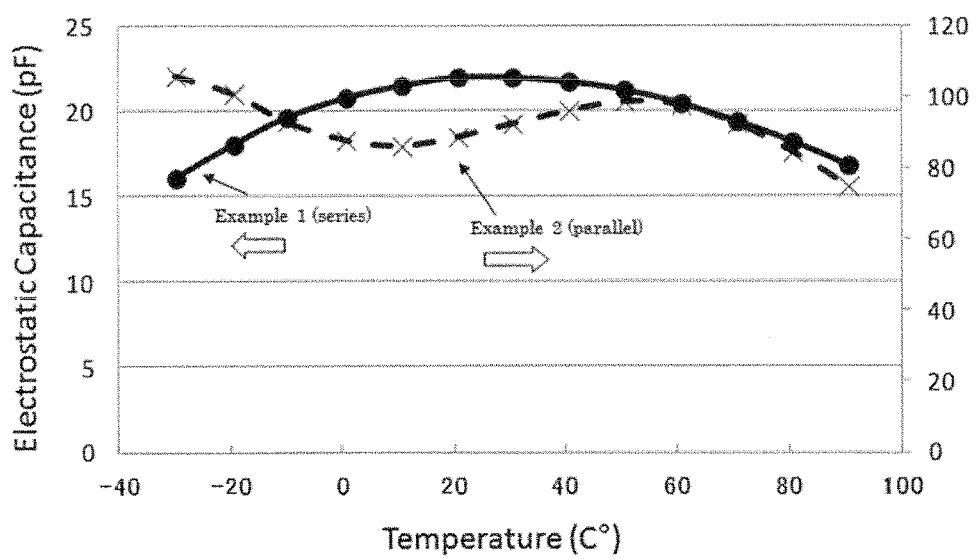
FIG. 10 is a graph of a temperature characteristic electrostatic capacitance of the electrostatic capacitance of variable capacitance elements of Examples 1 and 2.

Similarly to Comparative Examples, each of the samples of Examples 1 and 2 produced as described above was placed in a temperature tank and an impedance analyzer (HP4294A manufactured by Agilent Technologies) was used for measuring the electrostatic capacitance within a temperature range of about −40° C. to about +90° C. under the conditions of the voltage of about 1 Vrms and the frequency of about 1 kHz. In the same manner as Comparative Examples, the capacitance variable rate was obtained. The results are shown in FIG. 10 and Table 2.

TABLE 2

| sample number | connecting state of capacitor structures | material forming variable capacitance layers | | temperature change rate (%) of electrostatic capacitance | | variable rate (%, 0.5 V/μm) |
|---|---|---|---|---|---|---|
| | | | | maximum value | minimum value | |
| Example 1 | series | $(Ba_{0.6}Sr_{0.4})TiO_3$ | $Ba(Zr_{0.8}Ti_{0.2})O_3$ | 0.0 | −26.8 | 52 |
| Example 2 | parallel | $(Ba_{0.6}Sr_{0.4})TiO_3$ | $Ba(Zr_{0.8}Ti_{0.2})O_3$ | 19.4 | −2.8 | 51 |

From the results, it was shown that temperature characteristics completely different from the variable capacitor elements of Comparative Examples using only one material are able to be obtained by using different materials as the materials for the variable capacitance layers in the variable capacitance element and by adjusting the capacitance values acquired in the variable capacitance layers of the respective materials. Therefore, by adjusting the materials and the capacitance of the variable capacitance layers, the temperature characteristics and the electrostatic capacitance are able to be adjusted, so that the variable capacitance element is able to be designed in accordance with a particular application. Particularly, in Example 2 including the capacitor structures coupled in parallel, the change rate of the electrostatic capacitance was equal to or less than about ±10% in the temperature range of about −30° C. to about +60° C. and the change in the temperature characteristic was small. It was also confirmed that the samples of Examples 1 and 2 function as variable capacitance elements.

Examples 3 and 4

Variable capacitance elements of Example 3 (series) and Example 4 (parallel) were produced similarly to Examples 1 and 2 by using $(Ba_{0.6}Sr_{0.4})TiO_3$) and $Ba(Zr_{0.8}Ti_{0.2})O_3$), respectively, as the materials of the variable capacitance layers, and by adjusting the capacitance of the capacitor structure made of $(Ba_{0.6}Sr_{0.4})TiO_3$ to about 19 pF and the capacitance of the capacitor structure made of $Ba(Zr_{0.8}Ti_{0.2})O_3$ to about 56 pF at room temperature/20° C. by adjusting the thickness and the diameter d of the opposite portion.

Figure 11:
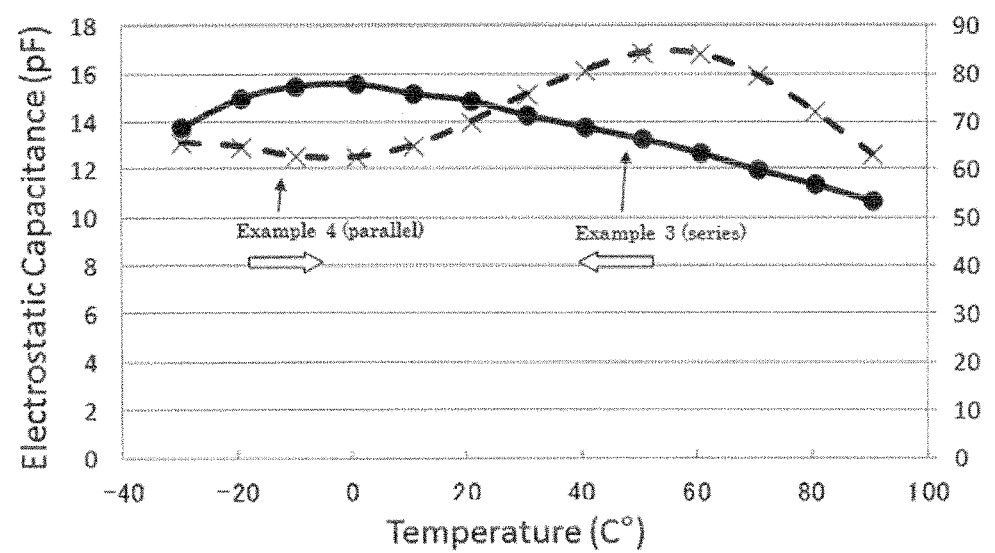
FIG. 11 is a graph of a temperature characteristic electrostatic capacitance of the electrostatic capacitance of variable capacitance elements of Examples 3 and 4.

Similarly to Examples 1 and 2, the electrostatic capacitance within a temperature range of about −40° C. to about +90° C. was measured. Similarly to Examples 1 and 2, the capacitance variable rate was measured. The results are shown in FIG. 11 and Table 3.

TABLE 3

| sample number | connecting state of capacitor structures | material forming variable capacitance layers | | temperature change rate (%) of electrostatic capacitance | | variable rate (%, 0.5 V/μm) |
|---|---|---|---|---|---|---|
| | | | | maximum value | minimum value | |
| Example 3 | series | $(Ba_{0.6}Sr_{0.4})\ TiO_3$ | $Ba(Zr_{0.8}Ti_{0.2})\ O_3$ | 4.7 | −14.8 | 45 |
| Example 4 | parallel | $(Ba_{0.6}Sr_{0.4})\ TiO_3$ | $Ba(Zr_{0.8}Ti_{0.2})\ O_3$ | 20.6 | −10.6 | 40 |

In the case of this example, unlike Examples 1 and 2, in Example 3 with series coupling, the change rate of electrostatic capacitance was equal to or less than about ±15% in the temperature range of about −30° C. to about +60° C., so that a variable capacitance element with a small temperature characteristic change can be acquired.

From the results, it is confirmed that the temperature change rate of the electrostatic capacitance is able to be made smaller as compared to the case of the variable capacitance including only one variable capacitance layer made of a single material, by using different materials to form the variable capacitance layers in which the electrostatic capacitance is obtained, by appropriately selecting the electrostatic capacitance values obtained in the respective variable capacitance layers, and/or by appropriately selecting the arrangement of the plurality of capacitor structures from series or parallel. Additionally, from the above results, the temperature characteristics, the electrostatic capacitance value, and other parameters of the variable capacitance element are able to be appropriately set by adjusting the materials of the variable capacitance layers and the electrostatic capacitance of each of the capacitor structures and, therefore, a degree of freedom in design is increased.

The protection elements according to preferred embodiments of the present invention may be used for a wide variety of electronic devices, such as an RFID (radio frequency identification) system, for example.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A variable capacitance element comprising:
   a plurality of variable capacitance layers made of a dielectric material;
   a plurality of paired electrodes located on both main surfaces of the variable capacitance layers opposite to each other across the variable capacitance layers;
   a plurality of insulating elements; and
   at least one pair of lead-out elements; wherein
   the plurality of variable capacitance layers and the plurality of insulating elements are alternately laminated to provide a laminated body;
   the plurality of variable capacitance layers and the plurality of paired electrodes define a plurality of capacitor structures; and
   each of the at least one pair of lead-out elements is electrically connected at one end thereof to one of the plurality of paired electrodes defining the capacitor structures, penetrates the plurality of insulating elements, and is electrically connected at another end to external electrodes or other electrical elements.

2. The variable capacitance element according to claim 1, wherein the plurality of capacitor structures are electrically arranged in parallel.

3. The variable capacitance element according to claim 1, wherein the plurality of capacitor structures are electrically arranged in series.

4. The variable capacitance element according to claim 1, wherein among the plurality of capacitor structures, at least one capacitor structure has an electrostatic capacitance different from other capacitor structures.

5. The variable capacitance element according to claim 1, wherein the plurality of variable capacitance layers include at least two types of variable capacitance layers made of different dielectric material.

6. The variable capacitance element according to claim 1, wherein the at least one pair of the lead-out elements are provided on a same or substantially a same axis perpendicular or substantially perpendicular to the plurality of variable capacitance layers.

7. The variable capacitance element according to claim 1, wherein a shape of each of the at least one pair of lead-out elements is one of a columnar shape, a truncated cone shape, a prismatic shape, a truncated pyramidal shape, or a hollow body.

8. The variable capacitance element according to claim 1, wherein a shape of each of the at least one pair of lead-out elements is one of a hollow or solid truncated columnar or pyramidal shape.

9. The variable capacitance element according to claim 1, wherein a material of the plurality of insulating elements is a ceramic material or a resin.

10. The variable capacitance element according to claim 1, wherein a material of the plurality of insulating elements is a sintered body of glass, a metal oxide, a metal nitride, or a metal carbide.

11. The variable capacitance element according to claim 1, wherein a material of the plurality of insulating elements is the same as the dielectric material from which the plurality of variable capacitance layers are made.

12. The variable capacitance element according to claim 1, wherein a material of the plurality of insulating elements as a lower permittivity than the dielectric material from which the plurality of variable capacitance layers are made.

13. The variable capacitance element according to claim 12, wherein the permittivity of the material of the plurality of insulating elements is about 500 or less.

14. The variable capacitance element according to claim 12, wherein the permittivity of the material of the plurality of insulating elements is about 300 or less.

15. The variable capacitance element according to claim 12, wherein the permittivity of the material of the plurality of insulating elements is about 100 or less.

16. The variable capacitance element according to claim 12, wherein the permittivity of the material of the plurality of insulating elements is about 30 or less.

* * * * *